(12) United States Patent
Cernasov

(10) Patent No.: US 8,294,633 B2
(45) Date of Patent: Oct. 23, 2012

(54) METHODS FOR REDUCING ARTIFACTS IN NEAR-TO-EYE DISPLAY SYSTEMS

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 622 days.

(21) Appl. No.: 12/435,786

(22) Filed: May 5, 2009

(65) Prior Publication Data

US 2010/0283919 A1     Nov. 11, 2010

(51) Int. Cl.
*G09G 5/00* (2006.01)
(52) U.S. Cl. ....... 345/8; 364/572; 364/724; 364/724.05; 364/724.1
(58) Field of Classification Search .................. 345/7–9; 364/572, 724, 724.05, 724.1
See application file for complete search history.

(56) References Cited

U.S. PATENT DOCUMENTS

| 4,908,874 | A | * | 3/1990 | Gabriel | ......................... 382/277 |
| 5,684,498 | A | * | 11/1997 | Welch et al. | ...................... 345/8 |
| 2008/0122737 | A1 | * | 5/2008 | Lea et al. | ........................ 345/11 |

* cited by examiner

*Primary Examiner* — Alexander S Beck
*Assistant Examiner* — Tony N Ngo
(74) *Attorney, Agent, or Firm* — Ingrassia Fisher & Lorenz, P.C.

(57) ABSTRACT

Provided are methods and systems for reducing visual distortion in near-to-eye ("NTE") visual display systems that is worn, at least partially, on a viewer's head. The movement rate of the viewer's head is sensed while an image that comprises individual content frames is displayed on the NTE using a vertically based raster scan. A characteristic of the raster scan is varied to mitigate distortion of the content frames due to the viewer's head movement.

17 Claims, 5 Drawing Sheets

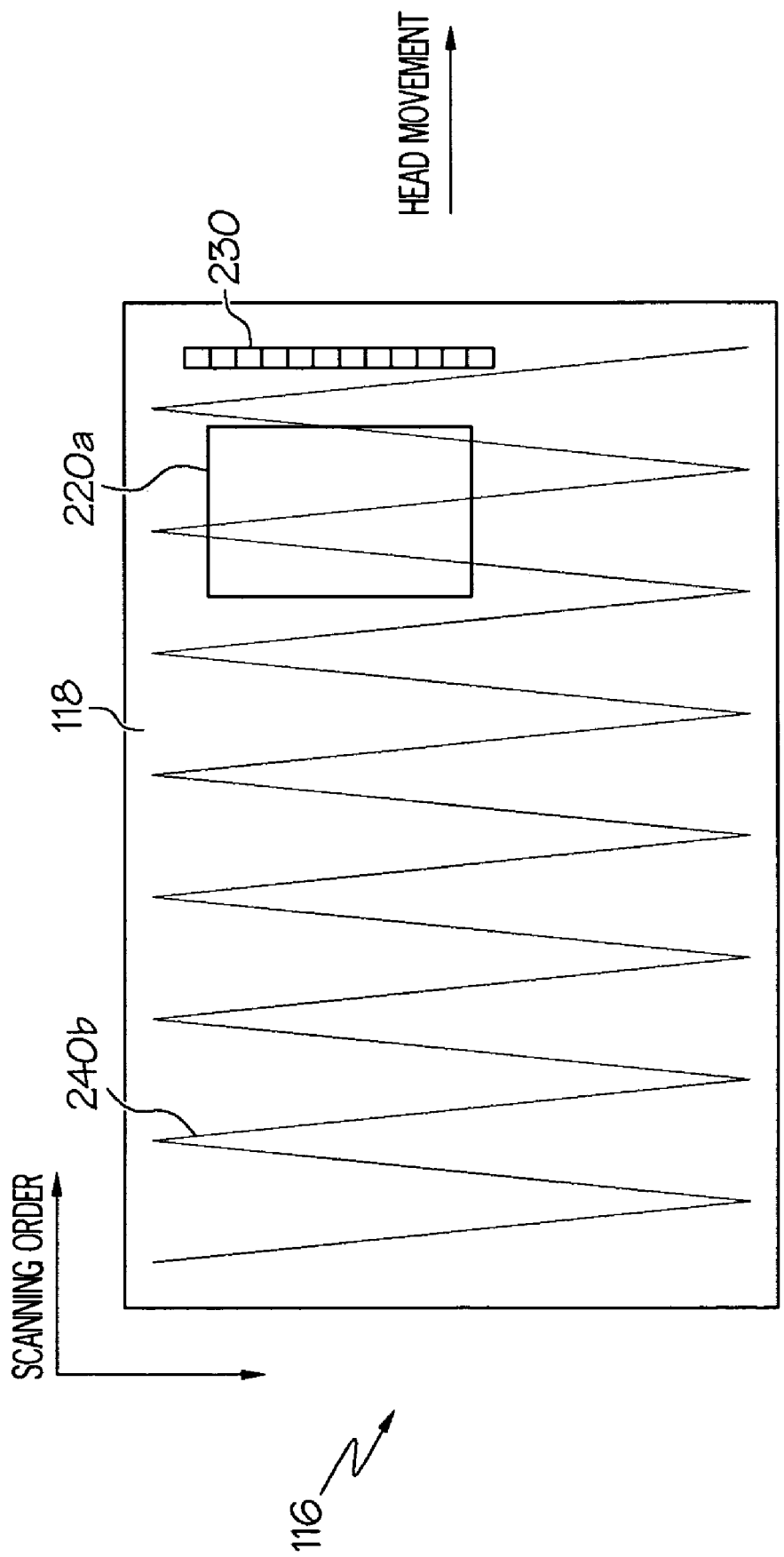

METHODS FOR REDUCING ARTIFACTS IN NEAR-TO-EYE DISPLAY SYSTEMS

TECHNICAL FIELD

The subject matter described herein relates to methods that reduce image distortion in near-to-eye ("NTE") visual displays due to rapid head motion of the viewer wearing an NTE display device.

BACKGROUND

One of the more important features in a cockpit is the Heads Up Display ("HUD") whereby flight control information is projected onto the wind screen of the aircraft so that the pilot may receive the information without taking his eyes from the airspace in front of him. However, there has been a growing interest in moving away from HUD systems to NTE or to NTE-HUD systems with head mounted viewing and sensor components that may be attached to a pilot's earphones or to his helmet.

A NTE system is characterized by a small display screen that is suspended directly in front of one or both of the pilot's eyes such that the displayed virtual object or image moves about the display screen as the pilot turns his head to look for other aircraft, look at his other controls and instrumentation, etc. The NTE display is otherwise transparent such that the pilot may see through or see past the display.

It would be disconcerting, disorientating and annoying to the pilot if information being sent to the NTE display was constantly visible in his display as he looks around him for other aircraft or for cockpit instrumentation. As such, a NTE display processor is programmed to register or be conformal with the NTE display information within a specific area within the cockpit such that when the pilot is looking at the area of image registration the NTE information is visible in his NTE display and when he turns, nods or cocks his head (i.e. yaw, pitch and roll), the NTE information moves in the opposite direction, and even out of view, until the pilot returns his head to a normal flight position.

The image registration is typically established by attaching one or more markers or marker bars to physical locations in the cockpit. The markers may have a particular shape or pattern, or may emit light at a particular frequency. The shape, pattern or emission frequency can be detected by the pilot's NTE headset and the detected position of the marker then causes the NTE processor to render the display on the NTE display screen only when the pilot's head is in a desired viewing position range relative to the marker.

However, the registration process as practiced in the art has not been perfect. It has been noticed that the majority of head movements are side-to-side (yaw) movements and the speed of the yaw movement has been determined to be in the 1000 degrees per second range compared to a nodding action (pitch) and cocking action (roll), which have been measured to be typically in the 400 degrees per second range. Pitch and roll movements are therefore of lesser concern.

Because of the relatively rapid side-to-side (yaw) speed, blurring and/or swimming of the NTE image or virtual object can occur when a pilot turns his head. Blurring is the loss of contrast due to multiple overlapping image rendering. Swimming is the phenomenon that occurs when different parts of an image move at different speeds.

Both blurring and swimming tend to occur because NTE head positioning sensor only periodically updates the position of a pilot's head. If a rapid yaw motion should occur during the interstitial time period between head position updates, sequential information frames will be presented with an abnormally large physical separation. The size of this separation which is a function of the head's travel time and velocity, and results in distortion such as horizontal blurring. The longer the latency between head position measurements the worse the distortion.

However, even in the absence of head sensor delays, some blurring and swimming will continue to occur due to the NTE display's inbuilt horizontal raster scan periodicities. Typical visual distortions due to horizontal raster scan periodicities include a blurring effect and/or a tilting of the virtual object image. Therefore, there is a need to improve an NTE display to minimize the distortion resulting from a pilot's head movement.

SUMMARY

It should be appreciated that this Summary is provided to introduce a selection of exemplary, non-limiting concepts. In one exemplary embodiment, a method for mitigating the distortion in a NTE raster scan video display due to rapid yaw head motion of a wearer is provided where a raster scan video display is configured such that its scan lines are rendered in a vertical orientation. At the completion of each of the plurality of vertical scan lines, the raster scan video display is advanced one column position horizontally.

In another exemplary embodiment, a computer readable medium is provided containing instructions that include determining a first column address, calculating a head yaw velocity, and determining a column address adjustment.

In another exemplary embodiment, an apparatus is provided comprising a processor and a video display screen that displays a plurality of raster scan lines. The video display screen is configured such that each of the plurality of the raster scan lines is rendered in a vertical orientation and is rendered serially and horizontally across the video display screen at the completion of each vertical scan line of the plurality in response to commands from the processor.

BRIEF DESCRIPTION OF THE DRAWINGS

FIG. 3 is an exemplary rendering of a virtual object image as presented in a vertically oriented raster display with head movement to the right.

DETAILED DESCRIPTION

The following disclosure is merely exemplary in nature and is not intended to limit the invention, the application or the uses of the invention. Furthermore, there is no intention to be bound by any theory presented in the preceding background or the following detailed description.

The subject matter now will be described more fully below with reference to the attached drawings which are illustrative of various embodiments disclosed herein. Like numbers refer to like objects throughout the following disclosure. The attached drawings have been simplified to clarify the understanding of the systems, devices and methods disclosed. The subject matter may be embodied in a variety of forms. The exemplary configurations and descriptions, infra, are provided to more fully convey the subject matter disclosed herein.

The subject matter herein will be disclosed below in the context of an aircraft. However, it will be understood by those of ordinary skill in the art that the subject matter is similarly applicable to many vehicle types and activities as human head movement is the same in any environment. Non-limiting examples of other vehicle types in which the subject matter herein below may be applied includes aircraft, spacecraft, watercraft and terrestrial motor vehicles. Non-limiting non-vehicle environments may include virtual reality simulators.

The subject matter disclosed herein may be incorporated into any suitable navigation, flight control system, or virtual reality system that currently exists or that may be developed in the future. Without limitation, terrestrial motor vehicles may also include military combat and support vehicles of any description.

Figure 1:
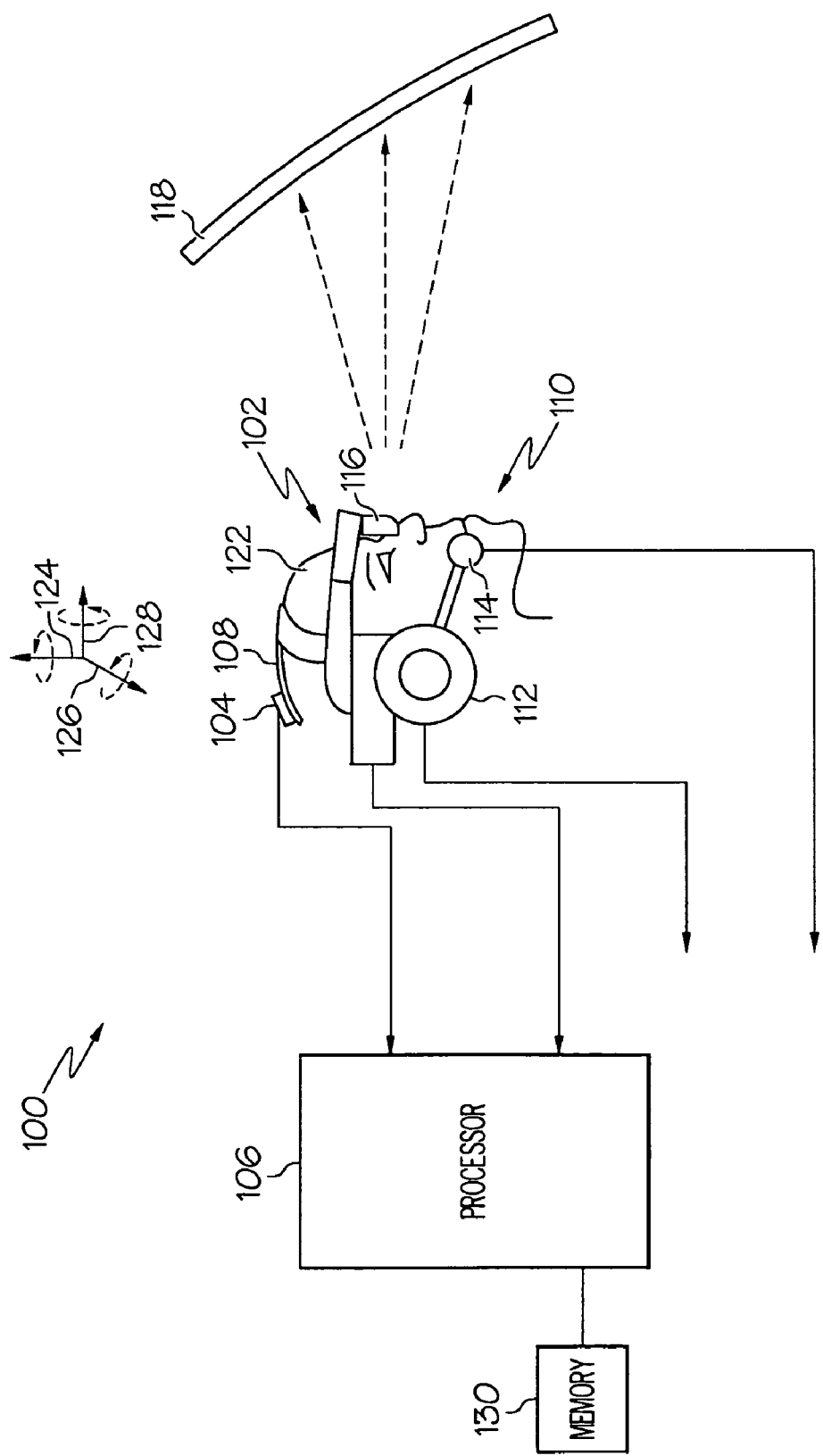
FIG. 1 is a simplified rendering of a NTE apparatus.

Turning now to FIG. 1, an exemplary embodiment of an NTE display system 100 that may be used, for example, in a vehicle is depicted. No matter the particular end-use vehicle, the display system 100 includes at least a near-to-eye (NTE) display device 102, a tracking sensor 104, a processor 106, and a memory 130 in operable communication with the processor 106.

The NTE display device 102 is preferably mounted on a headset 108. The headset 108 may be variously configured, but in the depicted embodiment the headset 108 is configured to be worn by a user (or viewer) 110, and may include one or more earphones 112 and a microphone 114. The earphones 112 are adapted to generate audio signals in response to signals received from, for example, a suitable non-illustrated interface. It will be appreciated that the non-illustrated interface may receive signals from, for example, a non-illustrated vehicle radio, the processor 106, and/or one or more other non-illustrated devices. It will additionally be appreciated that the earphones 112 may be variously implemented. For example, the earphones 112 may be implemented as active noise reduction (ANR) devices or passive devices.

The microphone 114 is adapted to detect viewer utterances or other vehicle noises and to transmit signals representative of the detected utterances or noises via, for example, a suitable non-illustrated interface. It will be appreciated that the non-illustrated interface may supply the signals to, for example, the non-illustrated vehicle radio, the processor 106, and/or one or more other non-illustrated devices. The microphone 114 may include, for example, a noise cancelling microphone or any one of numerous other suitable devices. In some embodiments, headset 108 also may include a non-illustrated push-to-talk (PTT) switch which, when depressed, causes the non-illustrated vehicle radio to transmit pilot utterances detected by the microphone 114 over the air. In other embodiments, a PTT switch may be disposed at a location remote from the headset 108.

The NTE display device 102, as noted above, is preferably mounted on the headset 108, and may include a monocular or binocular set of displays 116. Although the configuration of the displays 116 may vary, in one embodiment each display 116 includes a transparent display panel (e.g., a liquid crystal on silicon display), a light source (e.g., light emitting diodes), one or more prisms adapted to deflect light generated by the light source, one or more polarizers, and one or more lenses. With this configuration, the NTE display device 102 may display one or more virtual images to the viewer 110. That is, the one or more displayed images appear to the viewer 110 to overlie (or otherwise be disposed in proximity to) another surface, such as a vehicle windshield 118, and/or one or more non-illustrated vehicle instruments, and/or one or more non-illustrated vehicle control components. It is noted that in some embodiments the NTE display device 102 may be adjustably mounted on the headset 108. By adjustably mounting the NTE display device 102 on the headset 108, the NTE display device 102 may be moved into and out of the field of view of the viewer 110.

The sensor 104 is preferably mounted on the headset 108 and is configured to sense movements of at least the viewer's head 122 and/or the NTE display device 102. More specifically, the sensor 104 is configured to sense movement of the NTE display device 102, and to supply a signal representative of the sensed movement to the processor 106. In one particular embodiment, the sensor 104 is configured to sense, either directly or indirectly (e.g., derived from sensed position), at least a movement rate of the NTE display device 102 by sensing the movement rate of the viewer's head 122, and to supply a signal representative of the sensed movement to the processor 106. In any case, the movement that the sensor 104 senses preferably includes both translational movements and angular movements. The sensor 104 may also be configured, at least in some embodiments, to sense the position and orientation of the NTE display device 102 and/or the viewer's head 122.

The viewer's head position may be represented, for example, in terms of offsets from a static, default point in the vehicle. The viewer head orientation may be represented, for example, in terms of angles of rotation about a set of orthogonal reference axis (e.g., axis 124, 126, 128). For example, viewer head movements to the left or right may be represented in terms of angular rotation about axis 124, viewer head movements up or down (e.g., nods) may be represented in terms of angular rotation about axis 126, and viewer head tilts to the left or right may be represented in terms of angular rotation about axis 128.

It will be appreciated that although FIG. 1 depicts the sensor 104 as a single sensing device, the sensor 104 may be implemented, if needed or desired, as a plurality of sensing devices. Moreover, the particular type and configuration of the sensor 104 may vary, and may be implemented as any one of numerous suitable devices including, for example, an inertial movement unit (IMU), an inertial navigation unit (INU), one or more magnetometers, or auxiliary cameras locking on reference signals, just to name a few.

The NTE display device 102 and the sensor 104 are both in operable communication with the processor 106. The processor 106 may be implemented as one or more processors and/or other suitable electronic components, and may be configured to implement one or multiple functions. At least one function that the processor 106 implements is a display generator that renders one or more images on the NTE display device 102. The processor 106 may render the one or more images on the NTE display device 102 in response to various signals it receives from one or more non-illustrated external systems, subsystems, devices, or components. It will be appreciated that the processor 106 may be mounted on the headset 108, or it may be disposed remote from the headset 108 and form part of one or more other non-illustrated systems.

Processor 106 may be any suitably type of processor of sufficient speed. The processor 106 may be a general purpose processor or a special purpose processor. The processor 106 may be a single processor, multiple co-processors or processors distributed within a wireless or a wired network. Processor 106 is also a non-limiting example of a computer readable medium.

Memory 130 is in operable communication with the processor 106, and may be any type of suitable volatile or non-volatile memory. As discussed more thoroughly below, memory 130 may store display pixel information that may be used as pseudo or generic raster line information to mitigate distortion resulting from rapid movements of the pilot's head.

Memory 130 may comprise any or combination of memory or memory devices currently existing or that may exist in the future. Non-limiting examples of memory devices include random access memory (RAM), read-only memory (ROM), flash memory, programmable logic devices (PLD), magnetic disks, and optical disks. The preceding memory devices are also non-limiting examples of computer readable media.

Figure 2A:
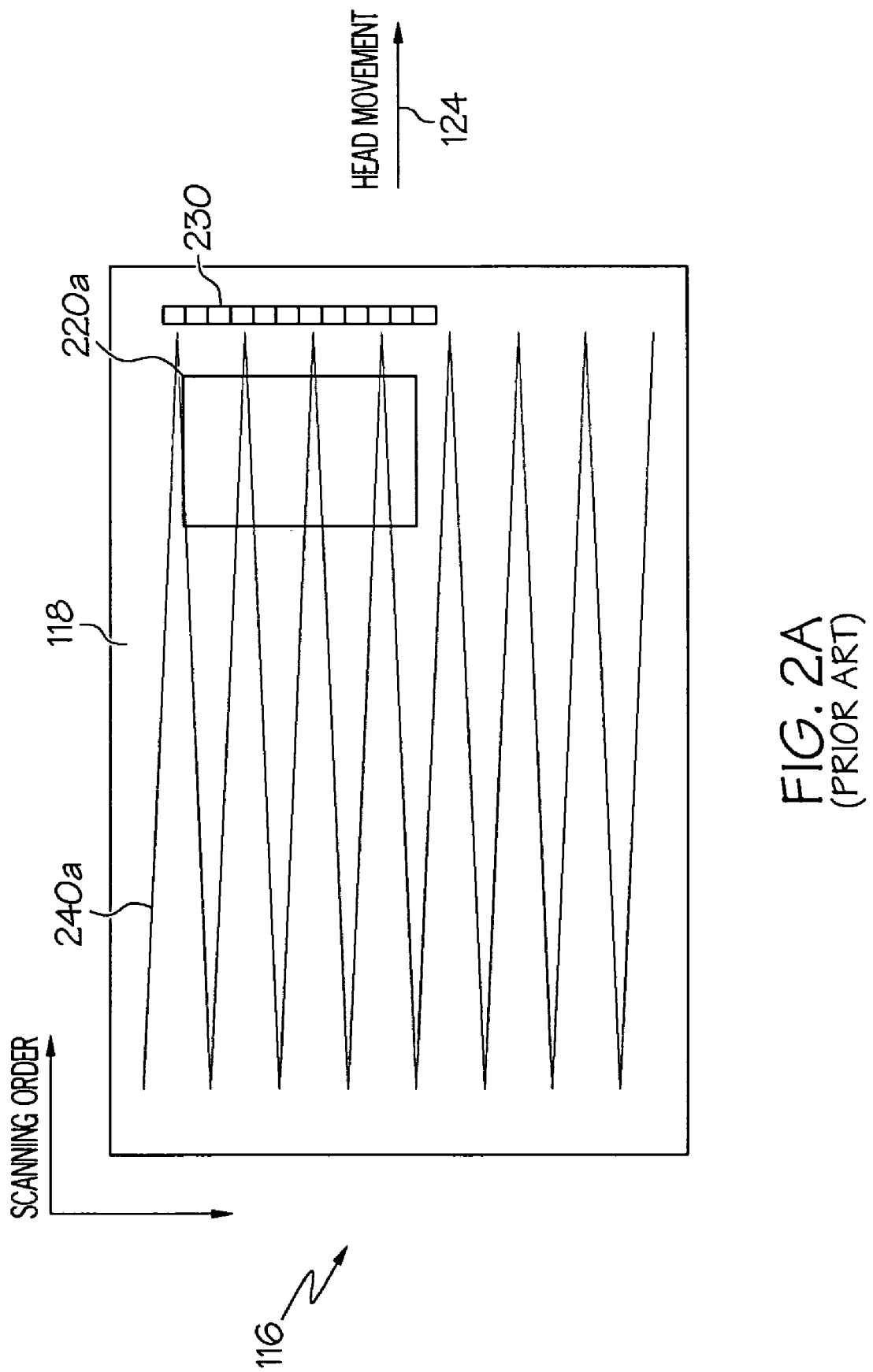
FIG. 2a is an exemplary rendering of a virtual object image as presented in a horizontally oriented raster display with no head movement.

FIG. 2a depicts display 116 rendering an image 220a when the tracker 104 measures little or no head motion. Thus, the image 220a is not distorted. The image 220a rendered in the viewing screen appears to be conformed or registered to a physical location within the cockpit in relation to the marker bar 230, which is physically attached somewhere in the external background 118 (i.e. the cockpit).

Figure 2B:
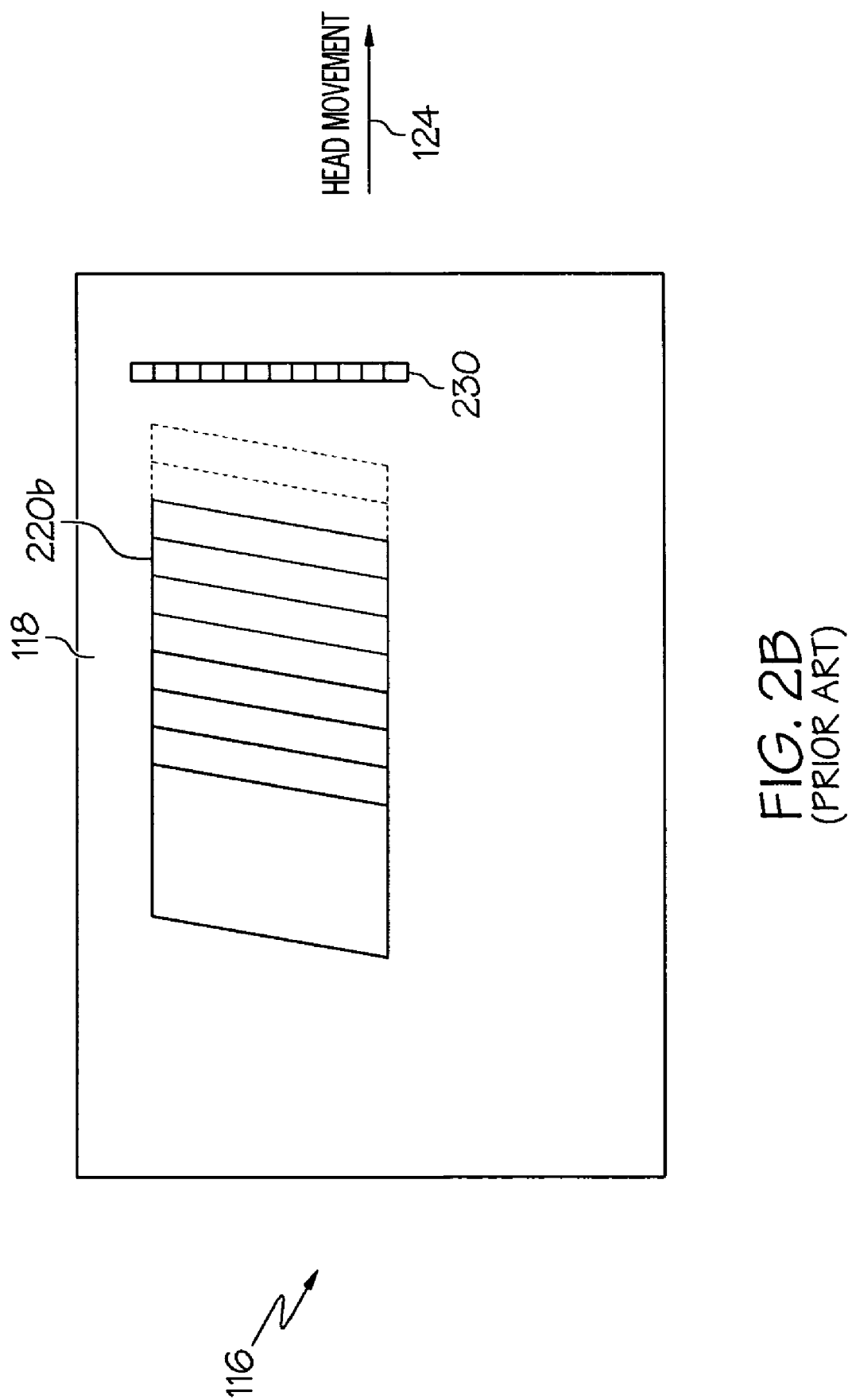
FIG. 2b is an exemplary rendering of a virtual object image as presented in a horizontally oriented raster display with head movement to the right.

FIG. 2b is an example of an overlapping image 220b that is rendered while the viewer 110 moves his head to the right. In such a case the processor 106 causes the overlapping image 220b to move left in the display 116. The overlapping image 220b also appears tilted because a conventional display 116 utilizes a conventional raster scan 240a that begins at the top left of the display and proceeds to the right in rows and then down the display 116.

In a conventional raster system, the time that it takes to move the active pixel from left to right across the display 116 is much faster than the time it takes to proceed from the top of the screen to the bottom of the screen. A horizontal traversal of the raster pattern 240a may be measured in microseconds while a complete vertical traversal may be measured in milliseconds. Because of the relatively slow vertical traversal speed, the bottom row of pixels is naturally the last to be rendered. As such, this may occur at the furthest point in the head movement such that that the bottom row of pixels appears to lead and the top line appears to lag because the top pixels were the first to be rendered and because the blurred image 220b is actually moving in the direction in the display 116 opposite from the direction of head movement 124.

FIG. 3 illustrates an exemplary, non-limiting embodiment that at least mitigates the blurring and/or tilting effects resulting from a yawing movement 124 of the pilot's head 122 in which the raster pattern 240b in the display, is turned 90° in either direction to change the scanning pattern from horizontal to vertical. By using a raster scan 240b with a vertical orientation, the rate of travel of the raster in the vertical direction is now much faster than it would have been if the raster scan in a horizontal orientation 240a. As such, the vertical movement of the raster 240b is also much faster relative to the fastest yaw movement 124 of a pilot's head 122. The increase in speed in the vertical direction may be on the order of 10×-1000× or more.

It is preferable that the vertical speed of the raster 240b be at least 10 to 100 times faster than the vertical speed of the raster 240a. It is more preferable that the vertical speed of the raster 240b be 100 to 1000 times faster than the vertical speed of the raster 240a. It even more preferable the vertical speed of the raster 240b be over 1000 times faster than the vertical speed of the raster 240a. At faster vertical speeds, the movement of the pilot's head 122 from side to side 124 during the several microseconds required to update an entire column of pixels is negligible and the image blurring therefore is diminished.

Even after changing the orientation of the raster scan, a blurred image 220b may continue to appear blurred toward the direction of the pilot's head movement 124 than if the pilot's head was stationary. This blurring effect may be reduced by electronically inserting (i.e. "stuffing") or removing vertical image lines with the raster 240b in vertical configuration. Specifically, if the pilot's head movement 124 is in the direction of the raster scan 240b, vertical image lines may be electronically removed from the image to counteract the blurring effect in one direction. Conversely, if the pilot's head movement 124 is in the direction opposite from that of the raster scan 240b, then vertical image lines may be electronically inserted, or stuffed, into the space between the actual vertical image lines. The inserted vertical image lines may be image lines duplicated from the last actual vertical image line rendered or the inserted vertical image lines may comprise pseudo or generic lines that are stored in the memory 130. Duplicated vertical image lines may be used in opaque images and pseudo or generic vertical image lines may be used for see through or translucent images. The number of removed or inserted vertical image lines may be proportional to the speed of the pilot's head movement although other relationships may be used as well.

Figure 4:
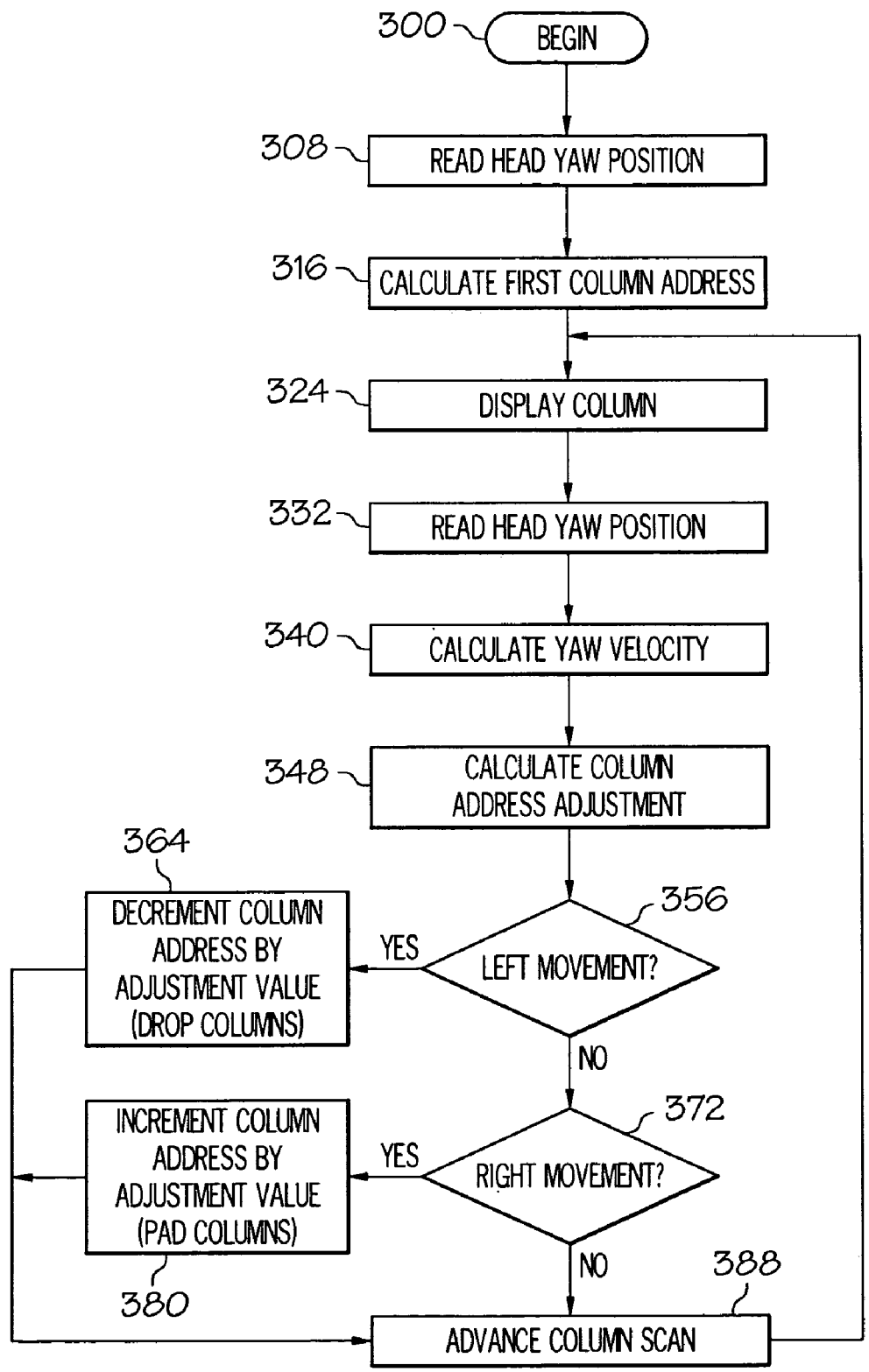
FIG. 4 illustrates an exemplary flow chart of an exemplary method to reduce tilting by adding or deleting raster image lines.

FIG. 4 is an exemplary, non-limiting logic diagram of an embodiment that may be used to implement the insertion and removal of vertical image lines. In this embodiment the raster scan is moving column by column from the top right of the display to the bottom left. However, the process may be implemented in the reverse or converse orientations as well with the commensurate changes of direction throughout the process.

It will be recognized by those of ordinary skill in the art that the embodiment disclosed below is merely exemplary in that some of the process may be broken out into sub-processes, that sub-processes and processes may be combined into combined processes and that functionally equivalent processes may be substituted. It will also be recognized that the method is not direction dependent. The method is just as applicable whether the scan pattern 240b is rotated 90° to the left or to the right from a conventional horizontal raster scan pattern 240a.

The method begins at process 300 with the pilot's head position being at a starting position. At process 308, a first yaw position is detected as the pilot turns his head 122. At process 316 a first column address is determined that corresponds with the first yaw position. At process 324 the first vertical column of pixels in the display is rendered at the first column address. At process 332, a second yaw position is determined and a yaw velocity is then calculated, at process 340, using the first yaw position and the second yaw position and the elapsed time period between the first and second determinations.

At process 348, the number of raster or pixel columns that would fit in the gap between the first column address where the display raster is currently located in the NTE to where the raster 240b would begin its next column after the head movement 324 is calculated. This gap may be termed a "Column Address Adjustment". As a non-limiting example, the Column Address Adjustment may be determined by calculating the integral number of vertical image lines (N) that will fit (or removed from) between two vertical image lines. The Column Address Adjustment may be calculated to be the closest integer produced by the formula:

$$N = m*R*T*\Omega(t)/W$$

where,
m=the number of pixel columns in the display
R=the distance from the eye to the display image
T=the image refresh period
$\Omega(t)$=a function of the head movement over time
W=width of the display At decision point 356, it is determined if the yaw movement was to the left. If so, then the NTE display would be commanded to decrement (or drop) the number of columns equal to the Column Address Adjustment. In this case actual vertical image lines equal to the Column Address Adjustment will be deleted. If the yaw movement was not to the left, then it would be determined at decision point 372 if the head movement was to the right. If so, then the NTE display would be commanded to increment (or advance) the column address in which the pixels are being rendered by the number determined by the Column Address Adjustment. In such a case, vertical image lines would be added or stuffed into the space equal to the Column Address Adjustment. If the head movement was negligible or indeterminate, then the NTE display column display scan is advanced to the next programmed column and the method proceeds back to process 324. When vertical image lines are added, previous vertical image lines may be copied in to the Column Address Adjustment space created by the head movement. Alternatively, stored or pseudo vertical image lines may be added instead.

The subject matter described above is provided by way of illustration only and should not be construed as being limiting. Various modifications and changes may be made to the subject matter described herein without following the example embodiments and applications illustrated and described, and without departing from the true spirit and scope of the present invention, which is set forth in the following claims.

What is claimed is:

1. A method for mitigating distortion in a near-to-eye raster scan video display due to rapid yaw head motion of a viewer, comprising:
    rendering a plurality of scan lines on the near-to-eye raster scan video display in a vertical orientation;
    performing a column address adjustment further comprising:
        incrementing a first column address that includes adding vertical video scan lines between any two consecutive vertical image lines when the head yaw is in the opposite direction from the advance of the raster scan video display,
        decrementing the first column address that includes dropping vertical video scan lines existing between any two consecutive vertical image lines when the head yaw is in the same direction as the advance of the raster scan video display; and
    upon completion of each of the plurality of vertical scan lines, advancing the raster scan video display one position horizontally based at least in part on the column address adjustment.

2. The method of claim 1 wherein the vertical raster scan display advances horizontally from one of the upper right corner and the upper left corner of the of the raster scan display to one of the lower left and lower right corner of the raster scan display, respectively.

3. The method of claim 1 wherein the vertical raster scan display advances from one of a lower right corner and a lower left corner of the of the raster scan display to one of an upper left and an upper right corner of the raster scan display, respectively.

4. The method of claim 1, further comprising determining a first column address.

5. The method of claim 4, further comprising calculating a head yaw velocity.

6. The method of claim 1,
    wherein the column address adjustment is subsequently applied to either decrement or increment each succeeding column address.

7. A computer readable storage medium containing non-transitory instructions that when executed by a computing device performs steps for reducing distortion in a video display, comprising:
    scanning a raster scan near-to-eye (NTE) display vertically;
    determining a column address adjustment further comprising:
        incrementing a first column address that includes adding vertical video scan lines between any two consecutive vertical image lines when the head yaw is in the opposite direction from the advance of the raster scan video display, decrementing the first column address that includes dropping vertical video scan lines existing between any two consecutive vertical image lines when the head yaw is in the opposite direction from the advance of the raster scan video display; and
    reducing a distortion effect resulting from the head yaw velocity by electronically adjusting an image displayed within the vertically oriented raster scan NTE display based at least in part on the column address adjustment.

8. The non-transitory computer readable storage medium of claim 7, wherein the column address adjustment is subsequently applied to each succeeding column address.

9. The non-transitory computer readable storage medium of claim 8, further comprising calculating a head yaw velocity of a viewer of the NTE.

10. The non-transitory computer readable storage medium of claim 8, further comprising determining a first column address.

11. A video display apparatus comprising:
    a processor configured to:
        supply display commands configured to generate a plurality of vertical raster scan lines,
        determine a column address adjustment further comprising:
            when a speed of motion is opposite to a direction of the raster scan lines being rendered serially and horizontally then adding a number of scan lines in proportion to a calculated distortion effect, otherwise, when the speed of motion is in the direction of the raster scan lines being rendered serially and horizontally then dropping a number of scan lines in proportion to the calculated distortion effect; and
    a video display screen electrically coupled to the processor and operable to display the plurality of vertical raster scan lines by completely rendering each of the plurality of the raster scan lines in a vertical orientation serially and horizontally across the video display screen.

12. The video display apparatus of claim 11, further comprising a motion sensor in operable communication with the processor.

13. The video display apparatus of claim 12, wherein the processor calculates the speed of motion from position information obtained from the motion sensor.

14. The video display apparatus of claim 13, wherein the processor calculates the distortion effect resulting upon the video display apparatus that is at least related to the calculated speed of motion.

15. The video display apparatus of claim 14, wherein the processor determines if the speed of motion is in the direction of the scan lines being rendered serially and horizontally.

16. The video display apparatus of claim 15, further comprising determine a first column address of a first vertical raster scan line.

17. The video display apparatus of claim 15, further comprising calculating a head yaw velocity.

* * * * *